United States Patent [19]
Paetzold

[11] 3,895,530
[45] July 22, 1975

[54] TUBULAR SWIRL FLOW METER
[75] Inventor: Wolf Paetzold, Hochheim, Germany
[73] Assignee: Elster, AG, Mainz-Kastel, Germany
[22] Filed: May 16, 1974
[21] Appl. No.: 470,403

[52] U.S. Cl. ............................................. 73/194 B
[51] Int. Cl.² .......................................... G01F 1/32
[58] Field of Search ...................... 73/194 B, 194 C

[56] References Cited
UNITED STATES PATENTS
3,116,639  1/1964  Bird................................. 73/194 B
3,279,251  10/1966  Chanaud........................... 73/194 B
3,616,693  11/1971  Burgess............................. 73/194 C Primary Examiner—James J. Gill
Attorney, Agent, or Firm—Darbo, Robertson & Vandenburgh

[57] ABSTRACT

The accuracy and range (in terms of the Reynolds numbers of fluids) of tubular swirl flow meters is increased by roughening the bounding flow surfaces within the measuring tube.

6 Claims, 3 Drawing Figures

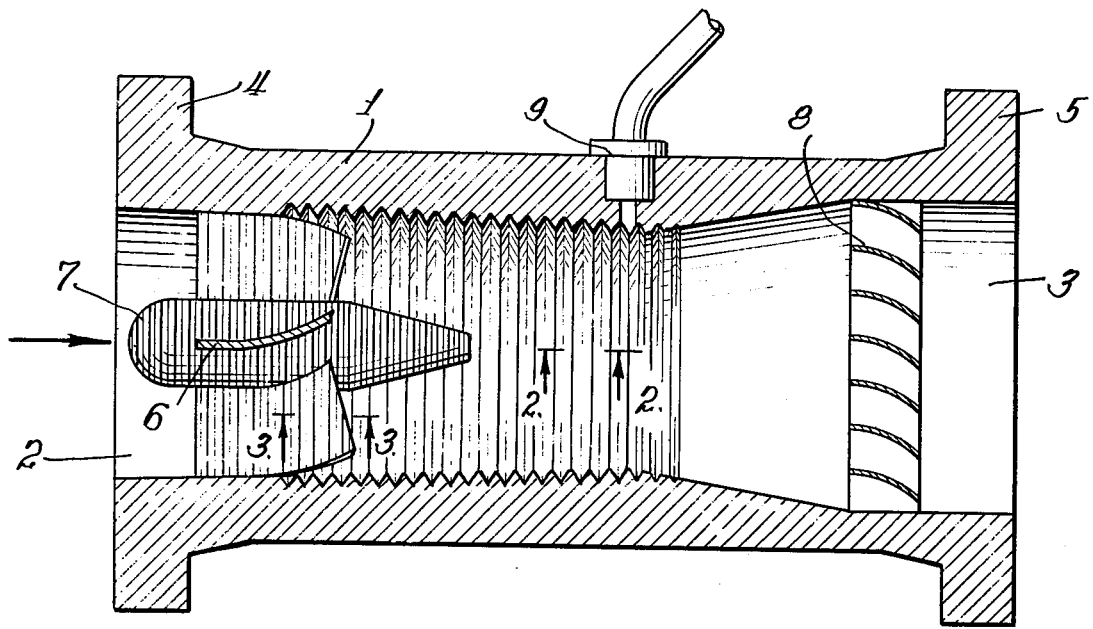
Fig.1.
Fig.2.
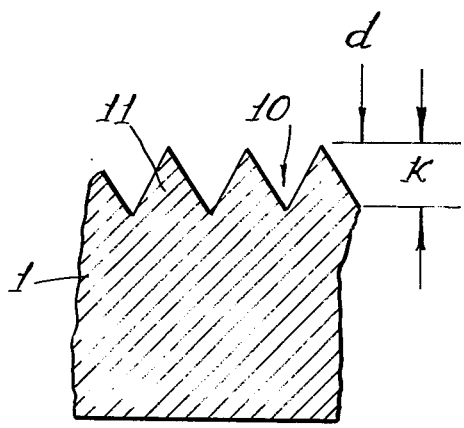
Fig.3.
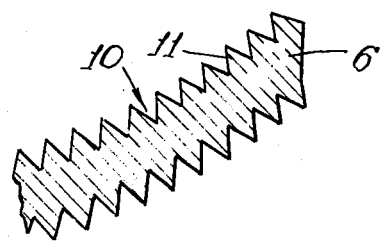

TUBULAR SWIRL FLOW METER

BACKGROUND AND SUMMARY OF THE INVENTION

The invention relates to a tubular swirl flow meter with at least one measuring sensor detecting the secondary rotation of the vortex core of the flowing fluid and a swirl device arranged upstream of the measuring sensor for generating the secondary rotation.

Through Swiss Pat. No. 453,732 it is a known practice to set the medium flowing through the measuring tube in a turbulent state, to bring the turbulent medium into precession and to measure the frequency as well as the amplitude of the precession movement. For this purpose the swirl flow meter is to be provided with, among other things, the parts described above. As swirl device the patent indicates turning vanes mounted in the upstream part of the measuring tube, or that this part of the inside of the tube is provided with windings or ribs. These ribs or windings must suffice to generate an effective turbulent flow up to or into the vicinity of the axis of the measuring tube.

There are known other swirl flow meters operating according to the same principle, but with additional means, of which there is mentioned by way of example German Pat. No. 1,904,435 and U.S. Pat. No. 3,314,289.

Underlying this measuring principle is the knowledge that between a turbulence frequency generated by a swirl device and the volume of fluid flowing through the measuring tube there exists a sufficiently precise linear relationship, it being possible to determine the linearity with the geometric form of the swirl device and the flow speed associated with it.

It has been proved that the linearity, however, is also influenced by the Reynolds number of the fluid to be measured. Known flow meters, therefore, have a sufficient linearity for a measuring instrument only within a certain Reynolds number range, which is restricted approximately to 1.2 to 1.3, a relatively limited range of usefulness. If with a swirl flow meter that is calibrated with a fluid having a certain Reynolds number, there is measured the flow of a fluid with a Reynolds number lying outside the range mentioned, then deviations of up to 10 percent are possible from the actual flow. This deviation has its cause in the change of the boundary layer thickness in dependence on the Reynolds number. As the Reynolds number increases the boundary layer thickness decreases whereby a minus error of the flow meter results through increase of the measuring cross section actively flowed through.

The general object of the present invention is to increase the calibratable measuring range of the swirl flow type of meter.

For the solution of the problem it is proposed according to the invention to make the boundary layer thickness, and in connection with this the actively flowed-through measuring cross section, entirely or very nearly independent of the Reynolds number. The solution consists in that the inner surfaces of the measuring tube in the zone extending from the swirl device up to or shortly after the measuring sensor are formed with a roughness, especially a roughness which is substantially transversely to the main flow direction of the fluid stream and the magnitude of the roughness is such that the ratio of the diameter D of the free passage to the roughness depth K is at most D/K=300, preferably a value between D/K=200 and D/K=50.

Through this expedient the potential flow present in the outer boundary layers is maintained very nearly constant for fluids having different Reynolds numbers. While at a low Reynolds number the velocity gradient determining the boundary layer thickness is low, the exactly defined roughness of the surfaces flowed over lies, therefore, in the range of the potential flow and thus remains without effect, the roughness at a high Reynolds number, which, as is well known, results in an increased velocity gradient, comes into effect, since it essentially prevents a decrease of the range of the potential flow and this influences the boundary layer thickness.

Theoretically the indicated lower ratio of the roughness depth to the diameter of the free passage is to be assigned to a swirl flow meter with smaller cross section and conversely, but there the form of the swirl device and possible additional arrangements for the improvement of the precession movement also play a role. In particular the length of the roughness in the indicated range can be dependent on the presence of the last-mentioned means.

The form and structure of the roughness may take on various forms. Thus, there can be present protuberances or depressions in the tube itself or on or in an inset part, but it is advantageous if in the construction according to the invention the roughness is formed by spaced grooves running transversely to the flow direction, or, according to another proposal, a single groove is present in the form of a screw thread. In the last-mentioned case the pitch of the thread, in the case of an especially effective swirl device, should be opposed to the general course of the swirling flow.

The effectiveness of the roughness is increased if, according to a final proposal, this has a profile with an acute angle.

Besides the broadening of the measuring range, however, a special advantage of the invention lies in that the calibration constant of the meter for gases having low densities can be determined and this calibration constant retains its validity also for fluids having high gas densities, thus simplifying the calibration.

The invention is now explained with the aid of the drawing.

DESCRIPTION OF THE DRAWING

FIG. 1 shows in schematic representation a swirl flow meter in cross section.

FIG. 2 is an enlarged detail view in cross section taken at the line 2—2 of FIG. 1.

FIG. 3 is an enlarged detail view in cross section taken at the line 3—3 of FIG. 1.

DESCRIPTION OF SPECIFIC EMBODIMENT

The swirl flow meter as illustrated in FIG. 1 comprises a measuring tube 1 with entrance 2 and exit 3 which is connectable by means of flanges 4 and 5 in a pipe line, not shown. In the entrance 2 of the measuring tube 1 there is arranged a swirl device comprising a hub 7 with several guide vanes 6 radiating outwardly therefrom, and in the exit 3 there is arranged suitable straightening vanes 8 for again smoothing the flow. Between the swirl device and the straightening vanes there is mounted on the measuring tube 1 a measuring sensor 9 extending into the interior of the tube. The sensor may be any suitable type of known measuring device such as a thermistor or a pressure pick-up device such as a piezo-electric transducer.

Detailers of the roughened surfaces of the inner wall of the measuring tube 1 are shown in FIG. 2. The roughness is formed here by grooves 10 spaced apart to form spaced ribs 11 having sharp profiles. The depth of the grooves 10, referred to above as the roughness depth, is marked K and the diameter of the free cross section of the passage is indicated at $d$.

FIG. 3 shows in detail the roughened surfaces of vanes 6 in FIG. 1. Here, too, the roughness is provided by grooves 10 and the ribs 11 having sharp profiles. The surfaces of hub 7 may also be roughened. It has been found that the roughening of the surfaces of the swirl device is important only in rare cases; i.e., only in extreme conditions. For maximum accuracy in the measurement of fluid flow over the maximum range of Reynolds numbers, all bounding flow surfaces within the tube 1 should be roughened as described.

I claim:

1. In a tubular swirl flow meter having a measuring tube, a swirl device at the entrance thereto and a measuring sensor downstream from the swirl device, the improvement wherein the internal surfaces of the measuring tube are rough, the roughened surfaces extending from the location of the swirl device within the measuring tube at least to the location of the measuring sensor, the ratio of the diameter of the tube to the depth of the roughness of the measuring tube surface being less than 300, the elements forming the roughness being formed by spaced substantially circumferential grooves and having sharp profiles at their crests.

2. Structure in accordance with claim 1 wherein the ratio of the diameter of the tube to the depth of the roughness of the measuring tube surface is between 200 and 60.

3. Structure in accordance with claim 1 wherein the surfaces of the swirl device are also rough.

4. Structure in accordance with claim 1 wherein the spaced substantially circumferential grooves comprise a screw thread.

5. Structure in accordance with claim 4 wherein the pitch of the screw thread is opposite to the direction of the swirling flow.

6. In a tubular swirl flow meter having a measuring tube, a swirl device at the entrance thereto and a measuring sensor downstream from the swirl device, the improvement wherein all bounding surfaces along which the fluid flows in passing through the measuring tube from the swirl device at least to the measuring sensor are rough, the crest elements of the rough surfaces being elongated and oriented substantially transversely to the main flow of fluid through the tube, the ratio of the depth of the roughness of the surfaces to the diameter of the tube being in the range between 200 and 50.

* * * * *